United States Patent [19]
Mattson

[11] Patent Number: 5,115,552
[45] Date of Patent: May 26, 1992

[54] METHOD OF MAKING A DYNAMIC SEAL FOR A LIQUID PUMP OR SPRAY GUN

[75] Inventor: Roy D. Mattson, White Bear Lake, Minn.

[73] Assignee: Mattson Spray Equipment, Inc., Centerville, Minn.

[21] Appl. No.: 756,806

[22] Filed: Sep. 9, 1991

[51] Int. Cl.⁵ ............................................. B29C 43/18
[52] U.S. Cl. ................................. 29/527.4; 29/888.3; 264/242; 264/262; 264/263; 264/267
[58] Field of Search ............... 264/267, 262, 242, 263, 264/264; 29/898.057, 898.055, 898.07, 527.4, 888.3

[56] References Cited

U.S. PATENT DOCUMENTS

| | | | |
|---|---|---|---|
| 2,853,321 | 9/1958 | Davey | 277/9 |
| 3,129,009 | 4/1964 | Simpson | 277/4 |
| 3,209,830 | 10/1965 | Orr et al. | 277/2 |
| 3,754,317 | 8/1973 | Taylor | 264/262 |
| 3,928,103 | 12/1975 | Hipsher et al. | 29/898.055 |
| 4,196,162 | 4/1980 | Stichter | 264/131 |
| 4,441,721 | 4/1984 | Harris et al. | 277/26 |
| 4,740,347 | 4/1988 | Sloan, Jr. et al. | 29/527.4 |
| 4,869,603 | 9/1989 | Melzer et al. | 264/262 |

Primary Examiner—Jan H. Silbaugh
Assistant Examiner—Brian J. Eastley
Attorney, Agent, or Firm—Jacobson and Johnson

[57] ABSTRACT

To seal against liquid leaking out around a rod which is slidably movable lengthwise axially within a chamber containing the liquid through an opening in the rear wall of the chamber, a ring of thermoplastic material is placed in the chamber around the rod and pressed against the rear wall of the chamber while applying heat to cause the thermoplastic material to flow into the opening around the rod and onto the outside of the wall so that when the heat is removed the material sets and latches itself onto the rear wall to seal off the space around the rod while still allowing the rod to slide easily.

4 Claims, 2 Drawing Sheets

METHOD OF MAKING A DYNAMIC SEAL FOR A LIQUID PUMP OR SPRAY GUN

FIELD OF THE INVENTION

This invention is for use in devices in which liquid is pumped or sprayed by operation of a plunger or rod or piston which moves back and forth longitudinally along the axis of a chamber or hollow bore of a housing or casing which contains the liquid. More particularly, this invention is directed for use to seal off the paint holding chamber of a paint spray gun.

DESCRIPTION OF THE PRIOR ART

In general, dynamic seals for preventing leakage around sliding plungers, rods or pistons in devices of the nature described above, have been achieved by utilizing a ring or washer of some suitable material. Typically, for illustrative purposes, the ring encircles the plunger at the chamber wall to seal against leakage around the outside of the plunger. The ring material has to have some resiliency and yet some degree of stiffness which will permit the rod to slide back and forth through the axial opening of the ring or washer and yet be tight enough to prevent or at least minimize leakage of the liquid around the outside of the rod or piston. Also, dynamic seals of this nature undergo a lot of wear so that even if initially effective, they have a limited life and the seals have to be replaced frequently. Some devices provide packing and a mechanism to apply increased pressure against the seal as it wears to try to lengthen its use.

SUMMARY OF THE INVENTION

To seal off leakage of liquids around the outside of a slidable rod or piston a seal is formed around the rod in situ, that is, while a rod or plunger is in place, by inserting a ring of thermoplastic material around the rod and applying heat and pressure to the ring of thermoplastic material so that the thermoplastic material flows along the wall that contains the opening through which the rod enters the chamber and substantially fills the space between the rod and the opening. After the heat and pressure are removed, the thermoplastic material sets and is latched or locked in place to seal off the opening around the rod while still permitting the rod to operate in its normal fashion. After it sets, the surface of the thermoplastic material which is in contact with the rod or plunger is very smooth so that there is only minimal friction between the seal and the plunger as it slides back and forth. In use, pressure applied to the thermoplastic material by paint or other liquid in the chamber acts on the seal to make it seal tighter. In a paint spray gun a dynamic seal formed in this fashion is able to prevent leakage of paint around the rod at quite high pressures yet permit the rod to slide easily and still provides a much longer life for the seal than was heretofore obtainable.

DESCRIPTION OF THE PREFERRED EMBODIMENT

Figure 1:
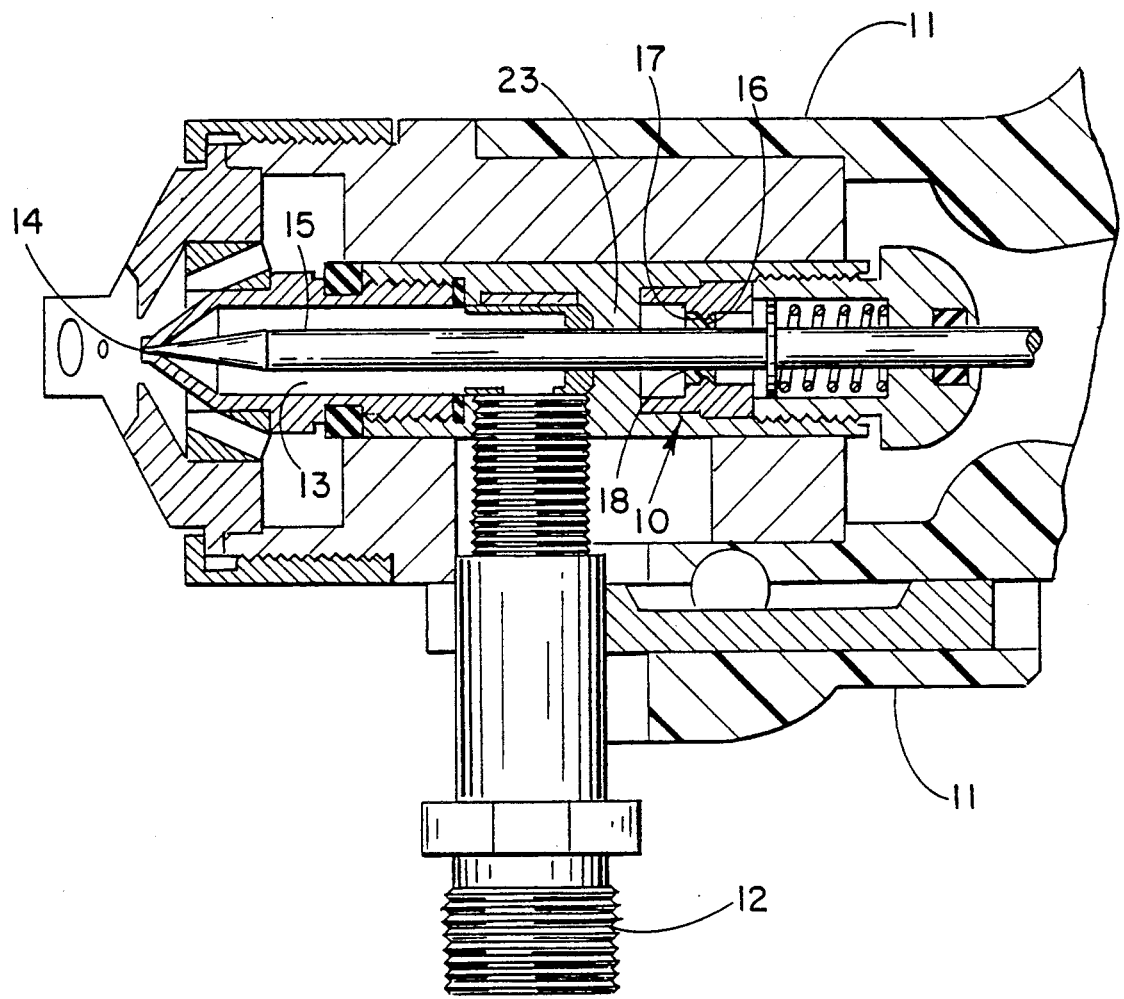
FIG. 1 is an illustration of a paint nozzle in a paint spray gun containing a seal formed in accordance with the teachings of this invention.

Typically and for illustrative purposes only, FIG. 1 shows a paint nozzle, generally designated by reference numeral 10, which is located in the barrel 11 of an air operated paint spray gun at or near the open or discharge end of the barrel. Paint enters radially through a fitting 12 into an interior chamber 13 of fluid nozzle 10 and exits out an outlet opening 14 at one end of the nozzle where it is formed into a suitable spray by pressurized air, in a well-known manner, not shown. A needle-like plunger or rod or piston 15 is axially slidably mounted through an opening 16 in the rear or upstream wall, generally designated by reference numeral 17, of chamber 13. An unsealed support 23 in chamber 13 helps to keep plunger 15 in axial alignment. Plunger or rod 15 is operated by a trigger mechanism, not shown, to slide axially back and forth to correspondingly open and close discharge opening 14 to allow paint to be expelled or ejected from chamber 13 or prevented from being expelled under control of a paint gun operator. A dynamic seal, generally designated by reference numeral 18, surrounds piston 15 at the opening 16 to prevent the liquid paint in the chamber 13 from leaking out around plunger 15. Seal 18 is made out of a suitable thermoplastic material. As illustrated in FIG. 1 and shown more clearly in FIG. 2C, seal 18 covers at least in part the interior or chamber side of rear wall 17, into the space between opening 16 and the exterior of rod 15 and at least in part extends over the outside or upstream side of wall 17. In this fashion seal 18 is latched or locked onto the rear wall 17 while surrounding plunger 15 and substantially completely closing off any space between the opening 16 and rod 15 through which the liquid paint might otherwise leak. Yet because of the nature of the material of seal 18, and the manner in which it is formed, the rod slides easily back and forth in chamber 13 as necessary to open and close discharge outlet 14. The preferred manner or method of forming the seal will be described subsequently. It has been found that in use the seal formed according to the teachings of this invention and as illustrated in the drawing has an improved self-sealing feature. With discharge or outlet opening 14 closed off by rod 15, the pressure of the paint, or other liquid, contained in chamber 13 acting rearwardly against seal 18 causes it to push tightly against rear wall 17 and compress the material to cause it to snug more closely around rod 15 in opening 16. Yet when the operator triggers the gun, rod 15 is able to slide smoothly through the opening in seal 18 to open paint discharge outlet 14.

Preferably wall 17 is machined or otherwise formed so that opening 16 is defined by a line or circle. Preferably, as illustrated in the drawing, wall 17 is annular with the interior and exterior sides tapered toward each other to meet at opening 16 so that the wall is generally triangular in cross-section with an apex of the triangle defining the circular opening 16. Alternatively, one side of wall 17 may be untapered with the other side tapered. Preferably the interior side or the chamber side of wall 17 is tapered rearward.

Figure 2A:
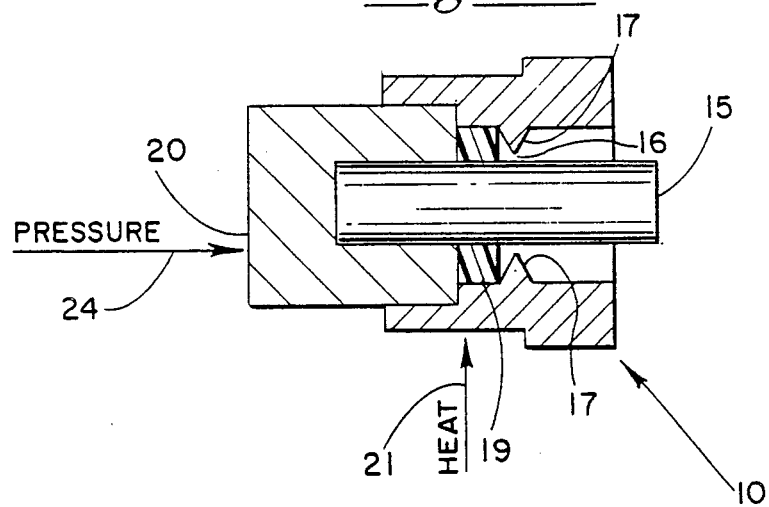
FIGS. 2A, 2B, 2C are diagrammatic illustrations of various stages of the process by which the seal is formed.
Figure 2B:
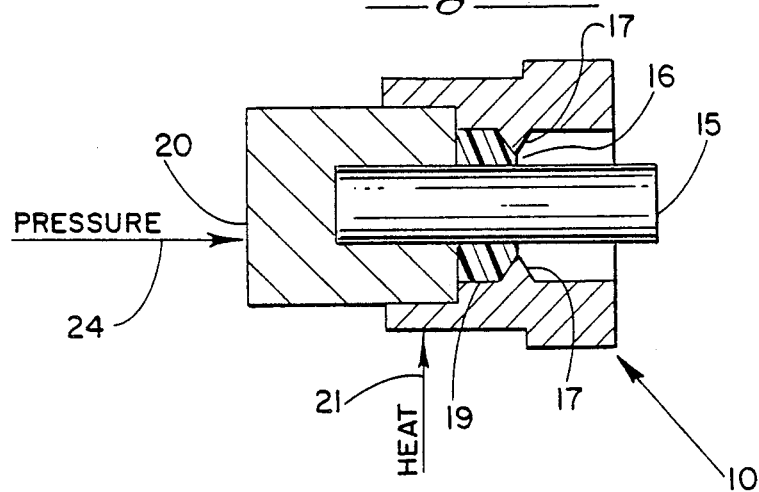
Figure 2C:
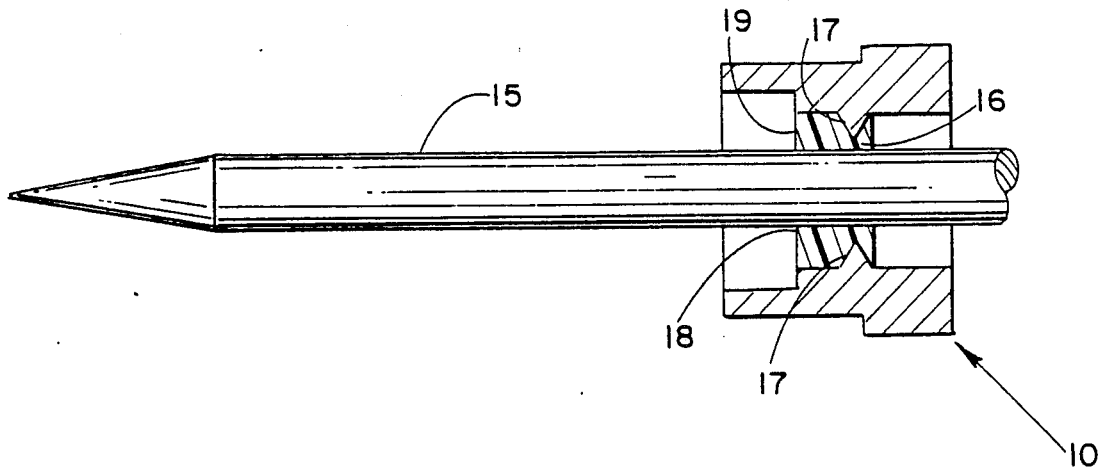

Turning to FIGS. 2A through 2C, for clarity only the part of paint nozzle 10 is shown which is necessary to describe and understand the invention. As mentioned earlier, preferably rear wall 17 is triangular in cross-section and opening 16 is defined by a circle constituting the apex of the triangular shape. Wall 17 can be formed into this shape, for example, by initially having a flat wall and then drilling out the opening using a tapered-end drill bit from each end of the fluid nozzle. The opening 16 is formed and dimensioned so that it will accommodate rod 15 and permit rod 15 to slide axially in chamber 13 of fluid nozzle 10. With the rod in place as illustrated in FIG. 2A, a ring 19 of thermoplastic material, such as polyethylene, is placed around rod or plunger 15 in chamber 13. Pressure, shown by arrow 24, is applied axially on a stud 20 to compress polyethylene ring 19 against the interior or chamber side of wall 17. While the pressure is maintained, heat is applied, as designated by arrow 21, to that area of the fluid nozzle from some suitable source, not shown. The combination of the elevated temperature and the pressure cause the thermoplastic material of ring 19 to soften and start to flow along the interior of wall 17 into the space around rod 15 in opening 16, see FIG. 2B, and then at least partway onto the exterior side of wall 17. When the heat is removed, the material is allowed to set and firms itself up to seal off opening 16 around rod 15 as illustrated in FIG. 2C. Pressure may be maintained while the material is setting.

The heat and pressure applied as described cause seal 18 to assume the illustrated form and thereby hook or latch itself in place around opening 16 so it is secured in place and does not work loose when rod 15 slides back and forth in the fluid nozzle chamber in use. Seal 18 formed as described is somewhat compressible. When outlet opening 14 is closed, pressure of liquid contained in chamber 13 directed toward rear wall 17 acts on seal 18 to press it tightly against rear wall 17 and also to compress the material of seal 18 to force it into the space between opening 16 and rod 15 thereby more securely and effectively sealing against potential liquid leakage. Also, as mentioned earlier, the characteristic of the thermoplastic material is such that when it sets, the annular surface acquires a very smooth finish as a result of having been formed around and in contact with the correspondingly very smooth finish on the surface of the rod. Therefore, minimal friction exists between seal 16 and rod 15 when the rod slides back and forth in use yet there is a firm seal which prevents any significant leakage. As the pressure in chamber 13 increases the seal becomes more effective.

For practical reason, generally speaking in the process described a standard rod with a highly polished surface is used when forming the seal. For final assembly, a replacement rod is used which is dimensionally a virtual duplicate of the standard.

The application of pressure on the thermoplastic material while heat is applied forces the material against the rear wall 17 but the material does not bond to the wall or the rod. For that reason, in use any pressure from the liquid in chamber 13 of fluid nozzle 10 acting against the seal apparently causes the seal material to compress against the wall and to expand radially into the space between rod 15 and opening 16 making it more leakproof. The small amount of sliding friction between the rod and the seal enhances the longevity of the seal.

I claim:

1. Forming a dynamic liquid seal within an opening through a wall of a chamber between said wall an axially slidable rod received through said opening, comprising the steps of:

placing a rod lengthwise coaxially through said opening in the wall of the chamber with a minute space between the rod and the opening so that the rod is able to slide back and forth lengthwise in the chamber through the opening;

placing a ring of thermoplastic material into said chamber around said rod;

applying pressure in an axial direction on said thermoplastic ring to force said ring against one side of said chamber wall while applying heat to cause the thermoplastic material to flow along said one side of said wall into the space between said rod and said wall opening to the other side of said wall; and removing the heat and pressure from said thermoplastic material to allow the thermoplastic material to set while the rod is in place.

2. The process for forming a dynamic seal as described in claim 1 further including the step of:

first forming the opening in the wall of the chamber into a circular linear opening.

3. The process for forming a dynamic seal as described in claim 1 wherein the heat and pressure are applied to make the thermoplastic material flow until it is hooked in place on said wall around said wall opening.

4. A method for forming in place a dynamic seal round a cylindrical rod slidably mounted in an axial opening of a wall of a chamber for liquid, comprising the steps of:

first, forming the axial opening in the chamber wall so that it is defined by a linear circle;

inserting a cylindrical rod lengthwise coaxially through said axial opening with a minute space between the rod and the opening so that the rod is able to slide back and forth lengthwise in the chamber through the opening;

placing a ring of thermoplastic material around said rod;

applying heat to soften said thermoplastic material while applying pressure on said ring to force the thermoplastic material against one side of said wall and into the space between said rod and said opening and onto the other side of said wall so that said thermoplastic material is hooked into place on said wall around said wall opening; and then removing the heat to allow the material to set.

* * * * *